(12) United States Patent
Gao et al.

(10) Patent No.: US 6,434,304 B2
(45) Date of Patent: *Aug. 13, 2002

(54) LIGHT WAVEGUIDE CABLE FOR USE IN HIGH-TENSION SYSTEMS

(75) Inventors: Zhan Gao, Coburg; Ulrich Greiner, Neustadt; Rainer Kamps, Grub am Forst, all of (DE)

(73) Assignee: CCS Technology, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,354

(22) Filed: Jan. 28, 2000

(30) Foreign Application Priority Data

Jan. 29, 1999 (DE) .......................................... 199 03 596

(51) Int. Cl.⁷ .................................................. G02B 6/44
(52) U.S. Cl. ........................ 385/109; 385/113; 385/128; 385/114

(58) Field of Search .......................... 385/109, 100–114, 385/123, 128

(56) References Cited

U.S. PATENT DOCUMENTS

| 4,673,247 | A | | 6/1987 | Oestreich | |
|---|---|---|---|---|---|
| 6,026,208 | A | * | 2/2000 | Will et al. | 385/128 |
| 6,108,475 | A | * | 8/2000 | Chapin et al. | 385/128 |
| 6,215,931 | B1 | * | 4/2001 | Risch et al. | 385/109 |
| 6,278,825 | B1 | * | 8/2001 | Casiraghi et al. | 385/100 |

FOREIGN PATENT DOCUMENTS

| DE | 3504041 A1 | 1/1986 |
|---|---|---|
| DE | 4318906 A1 | 12/1994 |
| DE | 4406690 A1 | 9/1995 |
| EP | 0 321 278 | 6/1989 |
| WO | WO 96/38892 | 12/1996 |
| WO | WO99/04300 | 1/1999 |

* cited by examiner

Primary Examiner—Phan T. H. Palmer

(57) ABSTRACT

In order to prevent an optical cable which is used with a high-tension cable from being damaged by Corona discharge, the optical cable has a cable cladding, provided with a Corona-resistant skin layer.

29 Claims, 1 Drawing Sheet

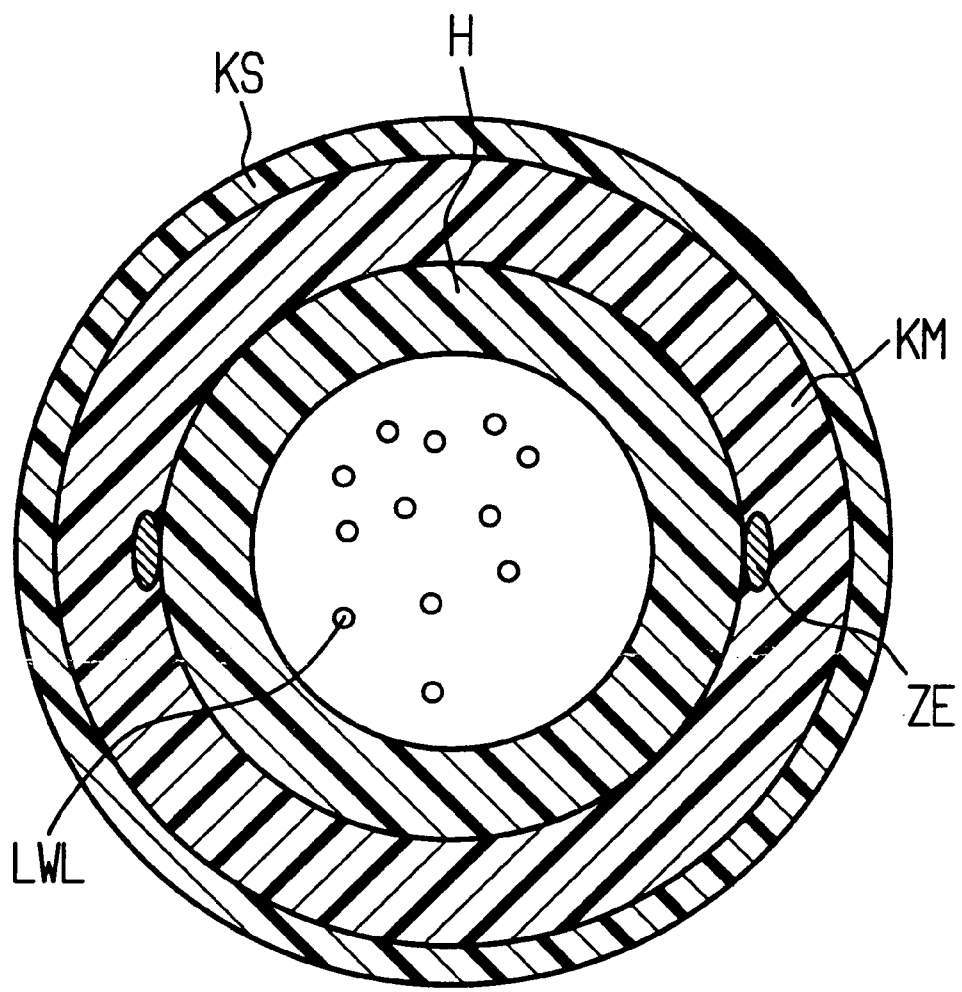

LIGHT WAVEGUIDE CABLE FOR USE IN HIGH-TENSION SYSTEMS

BACKGROUND OF THE INVENTION

The present invention is directed to a light waveguide cable composed of at least one light waveguide, a light waveguide bundle or a light waveguide ribbon having a cable cladding of plastic for utilization on a line cable of a high-tension system.

WO 96/38892 discloses a method for the installation of a light waveguide cable on an overhead high-tension line. The light waveguide cable, for example an optical overhead cable, is secured with the assistance of at least one cable strapped along a high-tension cable, whereby the cable strap is wrapped around the high-tension cable and the light waveguide cable with a wrapping, machine. What is referred to as an ADL cable (ADL=All-Dielectric) is especially suited for this purpose. It is composed of a tubular envelope into which the light waveguide, light waveguide ribbon or light waveguide bundle are loosely introduced. A cable cladding of plastic is located thereover and a gel-like substance can also be introduced into the interior of the tubular envelope, whereby the mobility of the light waveguide is preserved.

EP 0 321 278 A1 discloses a cable combination composed of an optical cable and an electrical conductor, for example a high-tension cable. The optical cable is helically wound around the electrical conductor. The optical cable is composed of a tubular envelope in which one or more light waveguides or light waveguide ribbons are introduced, so that they can move therein. A gel-like filling compound can also be provided. The envelope is surrounded with a tensile cladding and, potentially, with a further sheath of heat-resistant material.

Polyolefines, such as polyethylene or medium density (MDPE), high-density polyethylene (HDPE) or polypropylene (PP), are usually employed as materials for enveloping optical cables. These materials are potentially ultraviolet-stabilized with the addition of lampblack. Such envelopes are adequate, for example, for mounting at or, respectively, on phase cables of high-tension systems up to a voltage value of approximately 30 kV. Given higher voltages, however, Corona discharges occur that can lead to the premature destruction of the envelope or, respectively, the cable cladding.

SUMMARY OF THE INVENTION

The object of the present invention is to create a light waveguide cable whose cable cladding is protected against destruction by Corona discharges. This object is achieved with a light waveguide cable of a species initially cited in that a Corona-resistant layer is applied on the cable cladding. An optical cable having a known structure is cladded with a Corona resistant skin layer according to the present invention, so that the occurring Corona discharges can no longer destroy the cable cladding. The risk of premature destruction of the cable claddingy composed of the previously standard plastic materials is thereby prevented. High-temperature thermoplastics, such as, for example, fluoropolymers, silicones and polyimides as well as copolymers of these material compounds are particularly suited for such a skin layer. The necessary layer thickness for the skin layer amounts to 100 μm through 2 mm. This skin layer is applied as a surface-covering on the cable cladding, preferably by coextrusion during the manufacturing of the optical cable.

Other advantages and features of the invention will be readily apparent from the following description of the preferred embodiments, the drawing and claims.

BRIEF DESCRIPTION OF THE DRAWINGS

The FIGURE is a cross sectional view of a light waveguide cable according, to the present invention.

DESCRIPTION OF THE PREFERRED EMBODIMENTS

The principles of the present invention are particularly useful when incorporated in an optical cable OK with a Corona-resistant skin layer KS of the invention. This optical cable OK is composed of the known basis elements, namely light waveguides, light waveguide bundles or light waveguide ribbons, which are illustrated at LWL and are loosely introduced within a tubular sheath H. As needed, the tubular sheath H is also filled with a gel-like filling material in way that is known per se, whereby the mobility of the light waveguide elements LWL are preserved. A cable cladding KM of plastic, for example of polyolefine, such as, for example, low-density polyethylene (LDPE), medium-density polyethylene (MDPE) or linear low-density polyethylene (LLDPE) is then applied against the sheath H. Given an optical cable that, for example, is to be utilized at a line cable of a high-tension system, tensile elements ZE are usually also embedded in the cable cladding KM and proceed longitudinally along the cable. According to the present invention, a Corona-resistant skin layer KS of the above-mentioned materials is then arranged over this cable cladding KM. This is preferably produced by a coextrusion together with the cable cladding.

Although various minor modifications may be suggested by those versed in the art, it should be understood that we wish to embody within the scope of the patent granted hereon all such modifications as reasonably and properly come within the scope of our contribution to the art.

We claim:

1. A light waveguide cable composed of a tubular cable cladding receiving at least one optical element selected from a group consisting of a light waveguide, a light waveguide bundle and a light waveguide ribbon, said cable being utilized as a line cable on a high-tension system, the improvements comprising a Corona-resistant high-temperature thermoplastic skin layer being applied on the cable cladding.

2. A light waveguide cable according to claim 1, wherein the cable cladding is composed of a polyolefine selected from a group consisting of medium-density polyethylene, high-density polyethylene, low-density polyethylene, linear low-density polyethylene and polypropylene.

3. A light waveguide cable according to claim 2, wherein the polyolefine is ultraviolet-stabilized with lampblack.

4. A light waveguide cable according to claim 1, wherein the high-temperature thermoplastic is silicone.

5. A light waveguide cable according to claim 1, wherein the high-temperature thermoplastic is a polyimide.

6. A light waveguide cable according to claim 1, wherein the high-temperature thermoplastic is a copolymer of a fluoropolymer.

7. A light waveguide cable according to claim 1, wherein the high-temperature thermoplastic is a silicone copolymer.

8. A light waveguide cable according to claim 1, wherein the high-temperature thermoplastic is a copolymer of polyimide.

9. A light waveguide cable according to claim 1, wherein the layer thickness of the skin layer amounts to 100 μm to 2 mm.

10. A light waveguide cable according to claim 1, wherein the skin layer is applied by coextrusion with the cable cladding.

11. A light waveguide cable according to claim 1, wherein at least one strain-release element is embedded along the cable cladding.

12. A light waveguide cable according to claim 1, wherein the high-temperature thermoplastic is a fluoropolymer.

13. A light waveguide cable composed of a tubular sheath receiving at least one optical element selected from a group consisting of a light waveguide, a light waveguide bundle and a light waveguide ribbon, said sheath having a cable cladding, with the improvement being a Corona-resistant high-temperature thermoplastic skin layer being applied on the outer surface of the cable cladding.

14. A light waveguide cable according to claim 13, wherein the high-temperature thermoplastic is selected from a group consisting of a fluoropolymer, a silicone, a polyimide, a copolymer of fluoropolymer, a copolymer of silicone, and a copolymer of a polyimide.

15. A light waveguide cable comprising
- at least one optical element selected from a group consisting of a light waveguide, a light waveguide bundle and a light waveguide ribbon,
- a tubular cable cladding receiving said at least one optical element, and
- a high-temperature thermoplastic Corona-resistant skin layer on said cable cladding.

16. The light waveguide cable according to claim 15, further comprising at least one strain-release element embedded along the cable cladding.

17. The light waveguide cable according to claim 15, wherein the high-temperature thermoplastic is selected from the group consisting of fluoropolymer, silicone, polyimide, and copolymers thereof.

18. The light waveguide cable according to claim 17, wherein the high-temperature thermoplastic is a fluoropolymer.

19. The light waveguide cable according to claim 17, wherein the high-temperature thermoplastic is a copolymer of a fluoropolymer.

20. The light waveguide cable according to claim 17, wherein the high-temperature thermoplastic is a silicone.

21. The light waveguide cable according to claim 17, wherein the high-temperature thermoplastic is a copolymer of a silicone.

22. The light waveguide cable according to claim 17, wherein the high-temperature thermoplastic is a polyimide.

23. The light waveguide cable according to claim 17, wherein the high-temperature thermoplastic is a copolymer of a polyimide.

24. The light waveguide cable according to claim 15, wherein the layer thickness of the skin layer is from 100 $\mu$m to 2 mm.

25. The light waveguide cable according to claim 15, wherein the skin layer is applied by coextrusion with, the cable cladding.

26. The light waveguide cable according to claim 15, wherein the cable cladding is composed of a polyolefin selected from a group consisting of medium-density polyethylene, high-density polyethylene, low-density polyethylene, linear low-density polyethylene and polypropylene.

27. The light waveguide cable according to claim 26, wherein the polyolefin is ultraviolet-stabilized with lamp-black.

28. A light waveguide cable comprising:
- at least one optical element selected from a group consisting of a light waveguide, a light waveguide bundle and a light waveguide ribbon,
- a tubular cable cladding receiving said at least one optical element, and
- a high-temperature thermoplastic Corona-resistant skin layer, with a thickness of 100 $\mu$m to 2 mm, on said cable cladding.

29. The light waveguide cable according to claim 28, wherein the high-temperature thermoplastic skin layer is selected from the group consisting of silicones, polyimides, and copolymers thereof.

* * * * *